Feb. 4, 1947. J. G. HANSEN 2,415,209
GROMMET SPINDLE
Filed July 30, 1945

INVENTOR:
Juliane Grace Hansen.

Patented Feb. 4, 1947

2,415,209

UNITED STATES PATENT OFFICE 2,415,209

GROMMET SPINDLE

Juliane Grace Hansen, Santa Cruz, Calif.

Application July 30, 1945, Serial No. 607,806

2 Claims. (Cl. 57—21)

The present grommet spindle is useful for the production of grommets which may be made of cotton, and may be used as waterproof washers in bolting decks, gun-carriages, etc., in the building of ships.

After the grommet is dipped in red lead it is considered waterproof.

The cotton string used is commercially known as "six-ply waste." A single thread of this six-ply is threaded into a large needle, such as a No. 14 couching needle, and is used doubled. This doubled thread is wound several times around a grooved spindle and then is overcast through each of the grooves which allows space for the passage of the needle and thread under the cotton wound on the spindle. The grooves are essential because the thread must be wound snugly on the spindle. Without grooves the fragile waste thread in the needle would be destroyed.

Spindles in use at present are of hardwood "rounds," cut into six-inch lengths, and grooved at one end by means of a chisel or saw. Such spindles of hardwood are each good for about 100 hrs. of work. The needle chips off the wood in overcasting because it usually strikes against the side of the groove, and presently it does not slip neatly off the spindle. At this point in the work a new spindle is needed.

Moreover, the diameters of the "rounds" are not always standard bolt diameters; nor are they identifiable for blind workers.

I have invented a spindle to be moulded in plastic material. The diameters are standardized, and the figures for the diameters embossed on the ends of the spindles.

Referring to the drawing which accompanies this application:

Numeral 1 refers to the grooves, 2 inches long, of some depth at the outer end, and tapering to nothing at the inner end.

The number of grooves needed on a spindle varies according to the diameter of the spindle, i. e., a spindle of small diameter has fewer grooves than has a spindle of large diameter.

2 indicates the part used for a hand grip, 4 inches long; the middle part of this grip has the same diameter as the grooved ends; intermediate the middle portion and each of the grooved ends the spindle is somewhat reduced in diameter to form the hand fitting portions.

Figure 1:
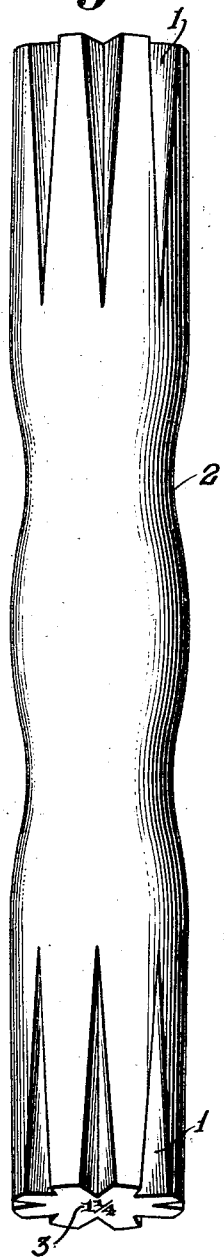
Fig. 1 is a perspective sketch of the entire spindle showing duplicate grooved ends, upon either of which the grommet may be fashioned, and the shaped middle portion for a hand grasp. The entire spindle is in a single piece, and is uniformly nine inches long.
Figure 2:
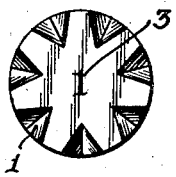
Figs. 2, 3 and 4 are end views of spindles of different diameters, showing variations in the number of grooves.
Figure 3:
Figure 4:
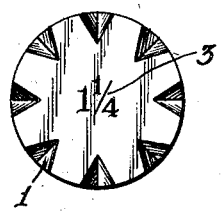
Figure 5:
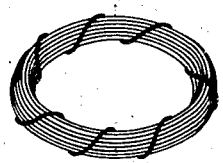
Fig. 5 is a view of a completed grommet.
Figure 6:
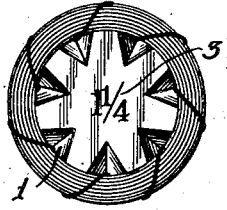
Fig. 6 shows an end of a spindle with the grommet thereon.

3 indicates the figures embossed on the ends, indicating the diameter of the grommet to be made. Since each end is used for like grommets these figures on each end are identical, i. e., in a spindle of 1⅛ inch diameter, the figure 1 is embossed on each end.

All spindles are slightly larger than the grommet made to compensate for the space taken in overcasting.

Below is a table of dimensions of diameters and grooves for twelve spindles most generally in use:

| Diameter of spindle | Depth of groove |
|---|---|
| 4 GROOVES | |
| | Inches |
| ⅜″ | 3/16 |
| ½″ | 3/16 |
| ⅝″ | 3/16 |
| ¾″ | 3/16 |
| 7 GROOVES | |
| 1″ | ¼ |
| 1 1/16″ | ¼ |
| 1⅛″ | ¼ |
| 1¼″ | ¼ |
| 8 GROOVES | |
| 1½″ | ⅜ |
| 1¾″ | ⅜ |
| 2″ | ⅜ |
| 2⅜″ | ⅜ |

I claim:

1. A moulded plastic spindle for manual production of grommets consisting of a generally cylindrical member, provided intermediate its ends with a curved hand fitting portion, and at its ends with a plurality of substantially V-shaped grooves of substantial depths at the ends of the spindle, and merging with the cylindrical surface near the hand fitting portion.

2. The spindle of claim 1 having, on its surface, embossed numerals indicating the size of the grommets to be made thereon.

JULIANE GRACE HANSEN.

REFERENCES CITED

The following references are of record in the file of this patent:

UNITED STATES PATENTS

| Number | Name | Date |
|---|---|---|
| 1,432,767 | Lurcott | Oct. 24, 1922 |
| 1,714,339 | Young, et al. | May 21, 1929 |
| 2,317,914 | McIntyre | Apr. 27, 1943 |
| 762,493 | Ruddy | June 14, 1904 |
| 753,629 | Renthe-Fink | Mar. 1, 1904 |

FOREIGN PATENTS

| Number | Country | Date |
|---|---|---|
| 684,036 | German | Nov. 2, 1939 |
| 51,757 | Swedish | Apr. 25, 1919 |
| 43,567 | Swedish | July 22, 1916 |